US008655276B2

(12) United States Patent
Hirose

(10) Patent No.: US 8,655,276 B2
(45) Date of Patent: Feb. 18, 2014

(54) COMMUNICATION APPARATUS, CONTROL METHOD FOR COMMUNICATION APPARATUS, AND STORAGE MEDIUM

(75) Inventor: Takatoshi Hirose, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 481 days.

(21) Appl. No.: 12/784,917

(22) Filed: May 21, 2010

(65) Prior Publication Data
US 2010/0311331 A1 Dec. 9, 2010

(30) Foreign Application Priority Data

Jun. 8, 2009 (JP) ................................. 2009-137345

(51) Int. Cl.
*H04B 7/00* (2006.01)
(52) U.S. Cl.
USPC ........................................ 455/41.2; 455/41.1
(58) Field of Classification Search
USPC ............................................... 455/41.1, 41.2
See application file for complete search history.

(56) References Cited

U.S. PATENT DOCUMENTS

2007/0190936 A1* 8/2007 Terui ............................ 455/41.1

FOREIGN PATENT DOCUMENTS

| JP | 2004-362264 A | 12/2004 |
|---|---|---|
| JP | 2007-221355 A | 8/2007 |
| JP | 2009-284029 A | 12/2009 |

OTHER PUBLICATIONS

"Worlds are About to Touch", Transfer Jet Overview Whitepaper, Transfer Jet Consortium, 2009.
Office Action for Counterpart Japanese Application No. 2009-137345, dated Dec. 25, 2012.
Office Action issued on Jun. 4, 2013 in counterpart Japanese Application No. 2009-137345.

* cited by examiner

*Primary Examiner* — Tuan H Nguyen
(74) *Attorney, Agent, or Firm* — Carter, DeLuca, Farrell & Schmidt LLP

(57) ABSTRACT

When a communication apparatus is brought within a predetermined range of a partner apparatus in a state where data of transmission target is designated, the communication apparatus notifies the partner apparatus of a transmission notification indicating that data transmission is performed, before transmission of the data of transmission target is started. When the communication apparatus has received the transmission notification from the partner apparatus, a transmission order of data is determined, and a communication is performed by switching between transmission of the data to the partner apparatus and reception of the data from the partner apparatus according to the determined transmission order.

14 Claims, 10 Drawing Sheets

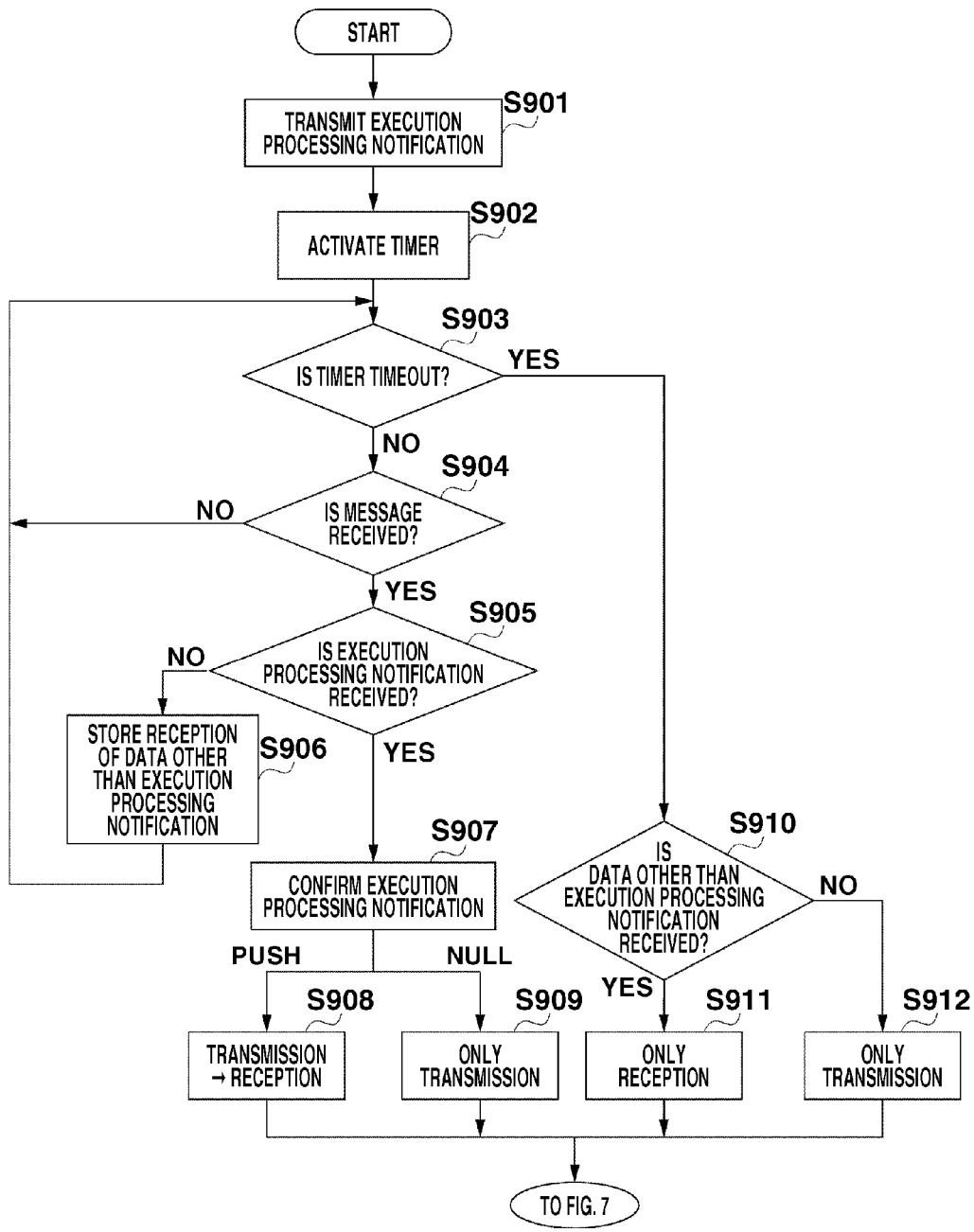

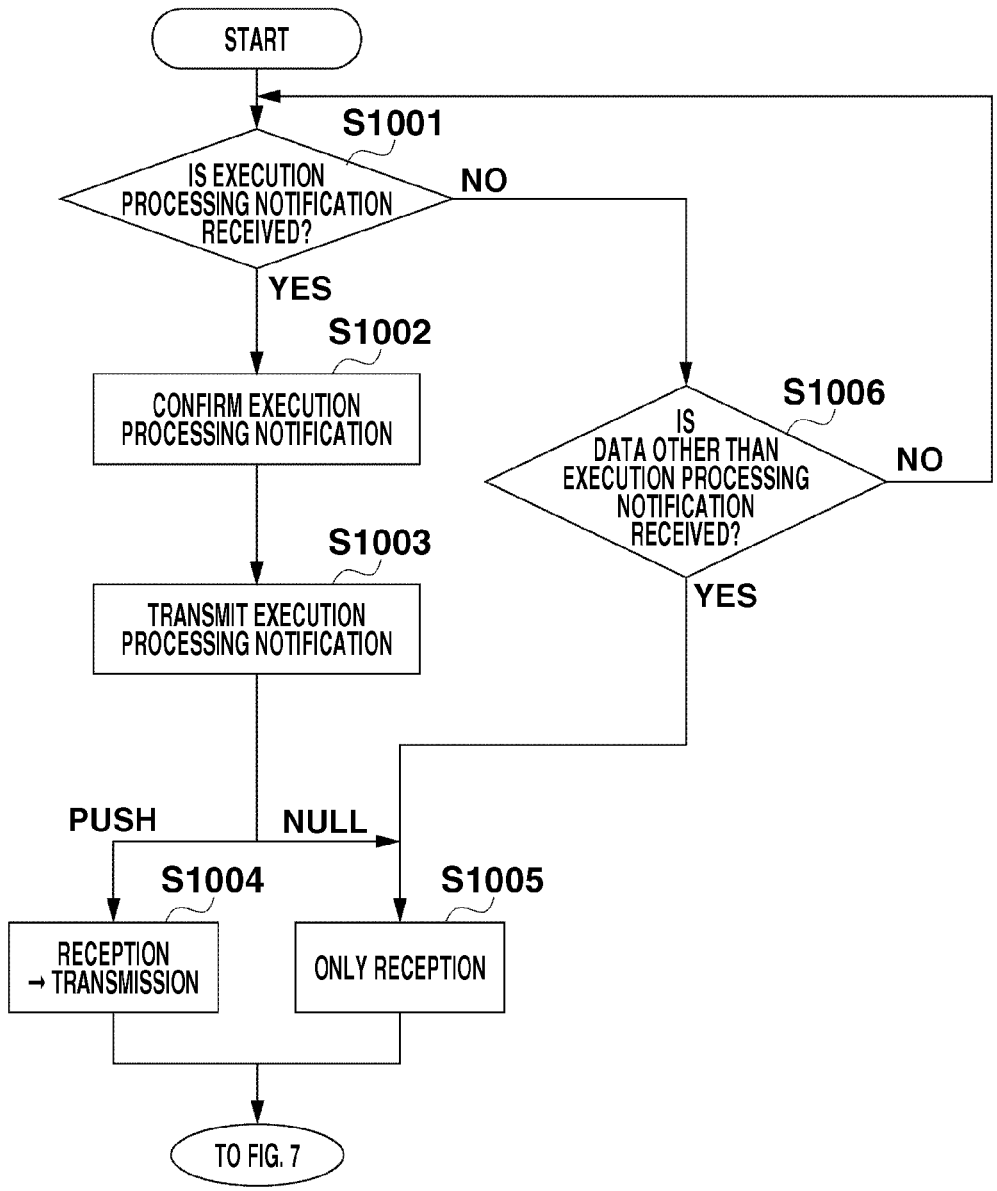

COMMUNICATION APPARATUS, CONTROL METHOD FOR COMMUNICATION APPARATUS, AND STORAGE MEDIUM

BACKGROUND OF THE INVENTION

1. Field of the Invention

The present invention relates to a communication system in which a communication apparatus can establish one-to-one wireless link with another communication apparatus by being disposed close within a predetermined range to perform data communication.

2. Description of the Related Art

In recent years, mobile telephones with a short-range data communication function using an infrared ray called an Infrared Data Association (IrDA) have appeared in the market, and various services using the IrDA have begun to spread out. By using the IrDA, transmission and reception of data such as image data and addresses between two sets of mobile telephones can be carried out as discussed in US 2007/0190936.

A general data communication method in mobile telephones with the IrDA will be described below. Firstly, a user "A" at a data transmission side operates a mobile telephone "a" and selects transmission target data, and activates a transmission application. Then, a user "B" at a reception side operates a mobile telephone "b" and activates a reception application, whereby data is transmitted from the mobile telephone "A" to the mobile telephone "B".

Further, recently non-contact communications (short-range wireless communications) such as Near Field Communication (NFC), TransferJet (trademark) have appeared. These non-contact communications, with very short communication distance, are controlled so that, when apparatuses that perform communications are brought as near as several centimeters or less to each other (for example, 10 cm or less for the NFC, 3 cm or less for the TransferJet), the wireless link is connected, and when they are moved away from each other, the wireless link is disconnected.

In the TransferJet, it is assumed that apparatuses perform one-to-one data communication with each other, and now a white paper describing use a case or the like is open to public view (Non-Patent Document 1: http://www.transferjet.org/tj/transferjet_whitepaper.pdf. In the Non-Patent Document 1, with the TransferJet, apparatuses are disposed very near to each other whereby enabling users to perform sharing of data.

In the case of the data communication method by the above-described IrDA, users of mobile telephones determine transmission side/reception side by verbal exchange of talks, and each is to activate transmission or reception application. Therefore, if the mobile telephones "a" and "b" each have data for transmission target, the user "A" and the user "B" must interchange roles of the transmission and reception, and perform again the above-described operation. If the transmission application is activated by both mobile telephones due to the user's mis-operation or lack of communication, the data communication cannot be carried out.

Also, as a method for data sharing in the TransferJet, such a method may be possible, in which the data communication is performed by bringing the user's own apparatus very close to another apparatus (partner apparatus), after the user has performed operation such as selection of transmission data. This is because, in the non-contact communications, if a distance between the apparatuses becomes a little far, outside the communication range, the wireless link will be eventually disconnected, accordingly it is difficult to perform operation such as selection of transmission of data, while keeping to maintain connection of the wireless link. However, how to control the data transmission and reception if the both apparatuses are brought close to each other in a state where selection of transmission data or the like is performed by the apparatuses, is not discussed in the Non-Patent Document 1.

SUMMARY OF THE INVENTION

The present invention is directed to a communication apparatus, a control method for the communication apparatus, capable of adaptively controlling transmission and reception of data, even when two apparatuses are disposed close to each other in a state where data of transmission target are designated in both apparatuses, in a communication system for establishing one-to-one wireless link to perform data communication by bringing two sets of apparatuses close to each other.

According to an aspect of the present invention, a communication apparatus capable of establishing an one-to-one wireless link with a partner apparatus by being brought close thereto within a predetermined range to perform data communication includes a notification unit, when the communication apparatus is brought within the predetermined range of the partner apparatus in a state where data of a transmission target is designated, configured to notify the partner apparatus of a transmission notification indicating that data transmission is performed before starting transmission of the data of transmission target, a determination unit configured to determine a transmission order of the data, when the communication apparatus receives the transmission notification from the partner apparatus, and a communication control unit configured to perform communication control by switching between transmission of the data to the partner apparatus, and reception of the data from the partner apparatus according to the transmission order determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is an operation flowchart performed by the wireless communication apparatus, which has been determined as a priority side.

FIG. 10 is an operation flowchart performed by the wireless communication apparatus, which has been determined as a non-priority side.

DESCRIPTION OF THE EMBODIMENTS

Various exemplary embodiments, features, and aspects of the invention will be described in detail below with reference to the drawings.

Figure 1:
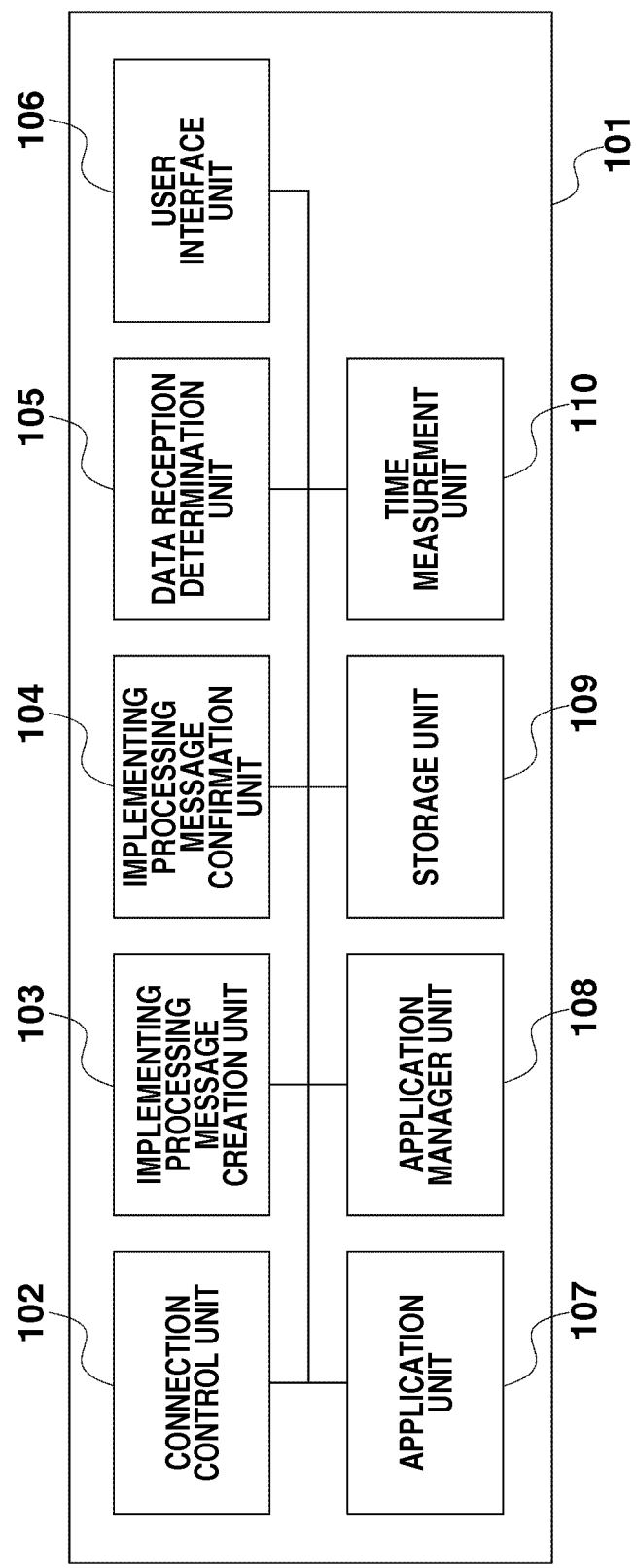
FIG. 1 is a functional block diagram of a wireless communication apparatus.

FIG. 1 is a block diagram illustrating an example of a functional block diagram of a wireless communication apparatus having a short-range wireless communications (non-contact communication) function.

FIG. 1 illustrates an entire wireless communication apparatus 101. A connection control unit 102 establishes and disconnects a wireless link, and performs data transmission control, when wirelessly transmitting and receiving data using the short-range wireless communications. As a short-range wireless communication system, the TransferJet, the NFC, and so forth can be applied. In the short-range wireless communications in the present exemplary embodiment, it is assumed that, establishment (connection) of the wireless link is completed, and the data communication becomes possible at the time when transmission and reception of connection request and connection response are completed.

An execution processing message creation unit 103 creates a message (hereinafter, an execution processing message) representing processing according to an instruction from a user. For example, if selection of transmission data, and a transmission instruction operation of the data are performed by the user, the execution processing message creation unit 103 creates an execution processing message indicating a "PUSH transmission". The execution processing message can be also referred to as data transmission notification indicating that data transmission is performed. An execution processing message confirmation unit 104 confirms a content of the execution processing message received from a partner apparatus, and determines whether the partner apparatus is going to transmit the data.

A data reception determination unit 105 determines that there has been data reception other than the execution processing message. A user interface unit 106 displays an image, an operation menu, a data transmission state, and other various kinds of information, and receives various operations from the user. An application unit 107, upon receiving a user instruction by the user interface unit 106, then activates a transmission, or a reception application, to perform processing of each application.

An application manager unit 108 performs intermediate service of a message between the application unit 107 and the connection control unit 102, and performs controls of activation and termination, and the like of the transmission and the reception applications in the application unit 107.

A storage unit 109 stores data of a transmission target, data received from the partner apparatus, and other various pieces of information. For example, information indicating that the wireless communication apparatus operates at the priority side or the non-priority side of data transmission, information regarding activation order of application, and the like are stored therein. A time measuring unit 110 is used as a timer (execution processing timer) or the like for measuring a predetermined period of time during which to wait for a reception of the execution processing message from the partner apparatus, after having transmitted the execution processing message.

All function blocks have interrelationship with each other on software or hardware basis. Also, the above-described function blocks are only an example, a plurality of function blocks may constitute one function block, or either of function blocks may be divided into blocks that perform furthermore a plurality of functions.

Figure 2:
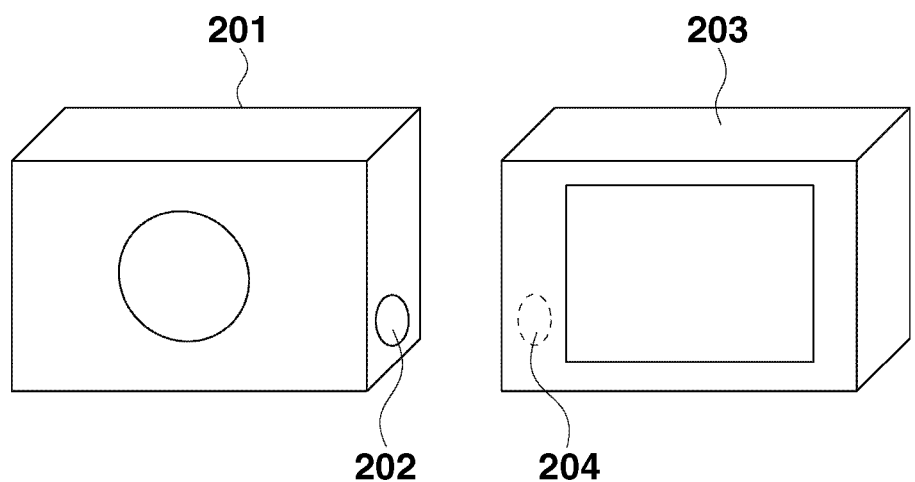
FIG. 2 is a system configuration diagram.

FIG. 2 illustrates a data transmission and reception system in the present exemplary embodiment. A wireless communication apparatus 201 and a wireless communication apparatus 203 can communicate with each other, by the short-range wireless communication interfaces 202, 204. The wireless communication apparatus 201, and the wireless communication apparatus 203 have both the configuration in FIG. 1. The short-range wireless communication interface may be incorporated in an apparatus or externally connected via a cable or the like.

Figure 3:
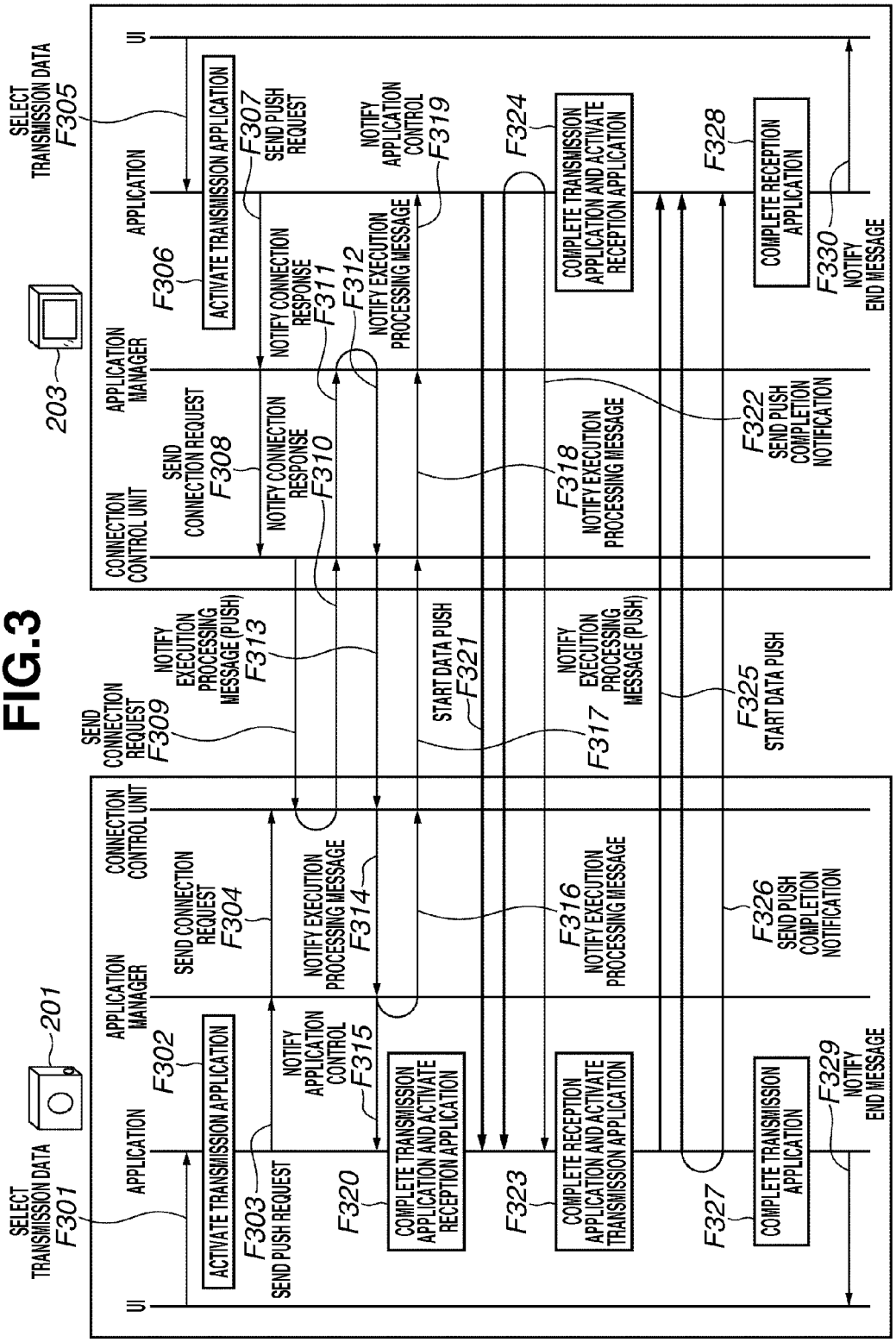
FIG. 3 is a sequence diagram 1.

FIG. 3 illustrates an example of a sequence in the present exemplary embodiment. FIG. 3 illustrates the sequence when data transmission operation is performed both in the wireless communication apparatus 201 and the wireless communication apparatus 203.

In the wireless communication apparatus 201, in step F301, if a selection (designation) of transmission data and a transmission instruction are performed by an operation of the user interface 106 by the user, then in step F302, the application unit 107 activates a transmission application. After the transmission application has been activated, the user brings the apparatuses very near to each other so that a distance between the wireless communication apparatus 201 and the wireless communication apparatus 203 falls within a predetermined communication range.

In step F303, the application unit 107 of the wireless communication apparatus 201 transmits a PUSH transmission request to the application manager unit 108. A flow in which the user interface 106 sends a PUSH request to the application manager unit 108, and the application manager unit 108 transmits an activation instruction of the transmission application to the application unit may be also allowed. In step F304, the application manager unit 108, which has received the PUSH request, sends a connection request to the connection control unit 102.

Also, in steps F305, F306, F307, and F308, similar processing is performed in the wireless communication apparatus 203. The connection control unit 102 of the wireless communication apparatus 201 and the wireless communication apparatus 203, which has received the connection request from the application manager unit 108, performs carrier-sensing, and transmits the connection request to the partner apparatus on a first-come, first-served basis. In this process, in step F309, it is described as the connection request from the wireless communication apparatus 203 has been first transmitted.

In step F310, the wireless communication apparatus 201, upon receiving the connection request, transmits the connection response to the wireless communication apparatus 203. In the short-range wireless communications in the present exemplary embodiment, connection of the wireless link will be completed at the time when the connection response from another apparatus is received in response to the connection request transmitted from one apparatus. When the wireless link connection is completed, it become possible for the both apparatuses to transmit and receive data.

The wireless communication apparatus 203, upon receiving the connection response, determines that communication apparatus 203 becomes the priority side, and causes the storage unit 108 to store thereof. On the other hand, the wireless communication apparatus 201, upon receiving first the connection request from the partner apparatus, determines that the communication apparatus 201 becomes the non-priority side, and causes the storage unit 108 to store thereof. A priority/non-priority side indicates, when there is data to be transmitted, whether an apparatus has the right to perform transmission of data earlier than a partner apparatus.

In step F311, the connection control unit 102 of the wireless communication apparatus 203, upon receiving a connection response, notifies the application manager unit 108 of the connection response. In step F312, the application manager unit 108 of the wireless communication apparatus 203, upon receiving the connection response, sends an execution processing message indicating a "PUSH transmission" to the connection control unit 102. In step F313, the connection control unit 102 of the wireless communication apparatus 203 transmits the execution processing message received from the application manager unit 108 to the wireless communication apparatus 203.

In step F314, the connection control unit 102 of the wireless communication apparatus 201 that has received the execution processing message in step F313 notifies the application manager unit 108 of the execution processing message. The execution processing message confirmation unit 104 of the wireless communication apparatus 201 confirms the message, and determines that processing requested by the wireless communication apparatus 203 is the "PUSH transmission".

Then, in step F315, the application manager unit 108 of the wireless communication apparatus 201 notifies the application unit 107 of a control message for instructing it to terminate the transmission application and to activate the reception application. In step F320, the application unit 107 of the wireless communication apparatus 201 terminates the transmission application currently running, and activates the reception application, according to a content of the received control message. Then, the application unit 107 prepares for the PUSH transmission from the wireless communication apparatus 203 serving as the priority side of the data transmission.

In step F316, the application manager unit 108 of the wireless communication apparatus 201 transmits the execution processing message indicating a "PUSH processing" to the connection control unit 102. In step F317, the connection control unit 102 transmits the execution processing message to the wireless communication apparatus 203.

In step F318, the connection control unit 102 of the wireless communication apparatus 203 that has received the execution processing message in step F317 notifies the application manager unit 108 of the execution processing message. The execution processing message confirmation unit 104 of the wireless communication apparatus 203 confirms the message, and determines that the processing requested by the wireless communication apparatus 201 is the "PUSH processing".

Then, in step F319, the application manager unit 108 of the wireless communication apparatus 203 notifies the application unit 107 of a control message for instructing it to start the data transmission by the transmission application currently running. The control message contains instructions for controlling to terminate the transmission application after having performed transmission of data, and to activate the reception application.

In step F321, the application unit 107 of the wireless communication apparatus 203 starts the PUSH transmission to the wireless communication apparatus 201, according to the content of the received control message, using the transmission application currently running. In the PUSH transmitting processing (not illustrated), an apparatus at the reception side replies an ACK serving as a confirmation response each time it receives data of one unit or a plurality of units.

In step F322, the application unit 107 of the wireless communication apparatus 203 transmits a PUSH completion notification when the PUSH transmission is completed. Then, in step F324, the application unit 107 terminates the transmission application, as well as activates the reception application, and prepares for the PUSH transmission from the wireless communication apparatus 201 serving as the non-priority side of the data transmission.

Also, in step F323, the application unit 107 of the wireless communication apparatus 201, upon receiving the PUSH completion notification in step F322, terminates the reception application, and reactivates the transmission application. Then, in step F325, the application unit 107 of the wireless communication apparatus 201 starts the PUSH transmission of data that has been selected by the user to the wireless communication apparatus 203.

When the PUSH transmission is completed, then in step F326, the application unit 107 of the wireless communication apparatus 201 transmits the PUSH completion notification, then in step F327, terminates the transmission application. Also, in step F328, the application unit 107 of the wireless communication apparatus 203, upon receiving the PUSH completion notification in step F326, terminates the reception application.

In steps F329, F330, the application units 107 of the wireless communication apparatus 201 and the wireless communication apparatus 203, when they respectively terminate the transmission and reception applications, notify a termination notification message to the user interface units 106. Then, respective user interface units 106, which have received the termination notification messages, display (notify) a message to indicate that the data transmission has been completed. A configuration to notify the user of the message by voice or the like may be allowed. It may be also acceptable to notify that reception of the data has been completed.

In this way, the application unit 107 of the wireless communication apparatus 203 does not transmit the termination notification message to the user interface unit 106 at a timing when data transmission therefrom is completed.

Hence, even if the data transmission of the wireless communication apparatus 203 is completed, until the data transmission from the partner apparatus (communication apparatus 201) is completed, the message is not displayed on the user interface unit 106. Therefore, a situation can be avoided, in which a user of an apparatus that has first completed the data transmission is misled into thinking that the data communication has been all completed, and eventually getting the apparatus away from the partner apparatus.

Figure 4:
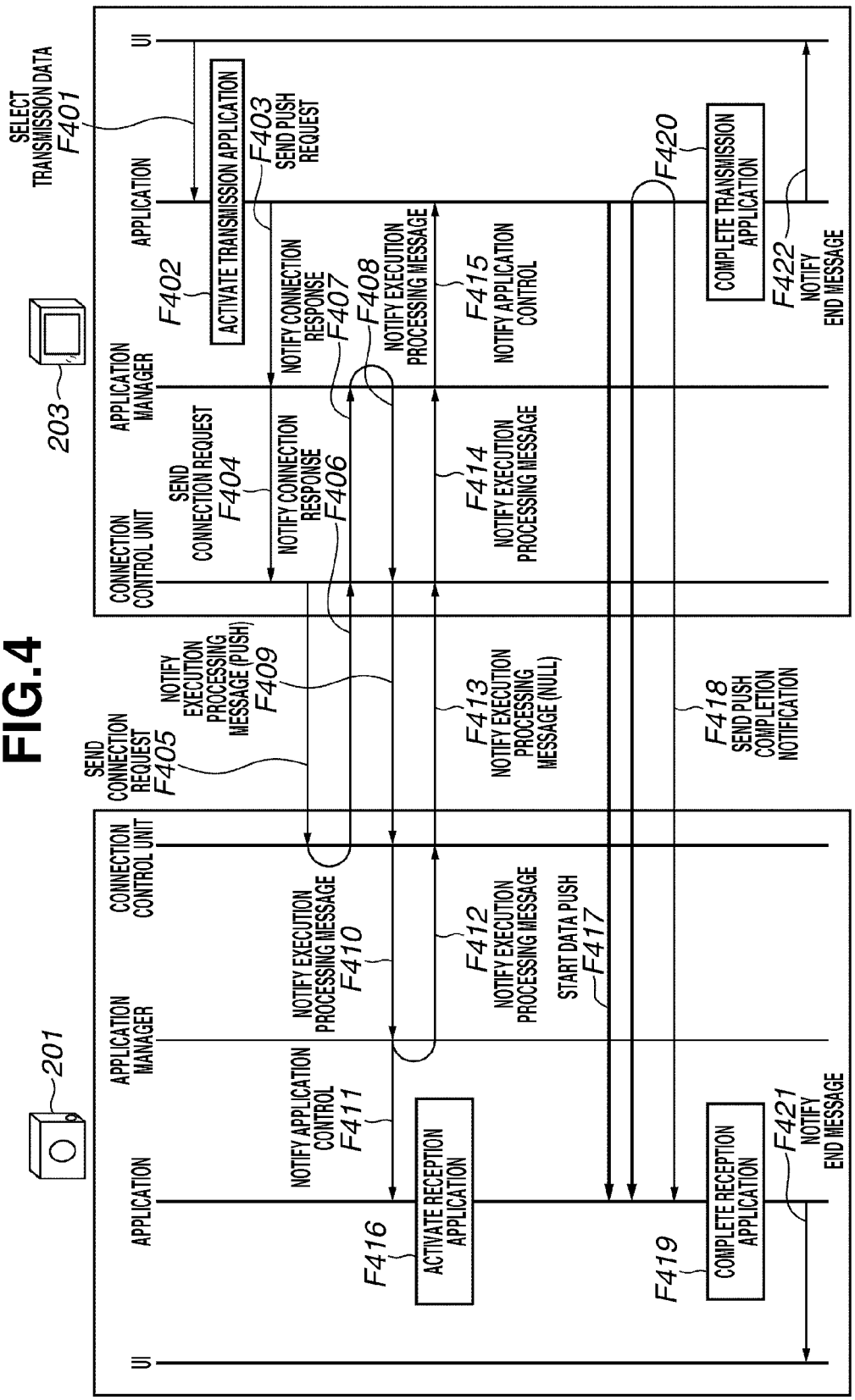
FIG. 4 is a sequence diagram 2.

Next, a sequence when data transmission operation is performed only at the one side will be described below. FIG. 4 illustrates a sequence when a user operation for the data transmission is performed in the wireless communication apparatus 203, and the wireless communication apparatus 203 is brought near to the wireless communication apparatus 201.

In step F401, when a selection (designation) of the transmission data and the transmission instruction are performed by an operation of the user interface 106 by the user, in the wireless communication apparatus 203, then in step F402, the application unit 107 activates the transmission application. After the transmission application has been activated, the user brings the two apparatuses close to each other so that a distance between the wireless communication apparatus 203 and the wireless communication apparatus 201 falls within a predetermined range.

In step F403, the application unit 107 of the wireless communication apparatus 203 transmits a request for the PUSH transmission to the application manager unit 108. In step F404, the application manager unit 108 that has received the PUSH request sends the connection request to the connection control unit 102.

In step F405, the connection control unit 102 of the wireless communication apparatus 203 transmits the connection request to the wireless communication apparatus 201. In step F406, the wireless communication apparatus 201, upon receiving the connection request, transmits the connection response to the wireless communication apparatus 203. The wireless communication apparatus 203, upon receiving the connection response, determines that the wireless communication apparatus 203 becomes the priority side, and causes the storage unit 108 to store thereof. On the other hand, the wireless communication apparatus 201, upon receiving the connection request from the partner apparatus, determines that the wireless communication apparatus 201 becomes the non-priority side, and causes the storage unit 108 to store thereof.

In step F407, the connection control unit 102 of the wireless communication apparatus 203, upon receiving the connection response, notifies the application manager unit 108 of the connection response.

In step F408, the application manager unit 108 of the wireless communication apparatus 203, upon receiving the connection response, transmits an execution processing message indicating the "PUSH transmission" to the connection control unit 102. In step F409, the connection control unit 102 transmits the execution processing message to the wireless communication apparatus 201. In step F410, the connection control unit 102 of the wireless communication apparatus 201 that has received the execution processing message in step F409, notifies the application manager unit 108 of the execution processing message.

The execution processing message confirmation unit 104 of the wireless communication apparatus 201 confirms the message, and determines that processing that the wireless communication apparatus 203 requested is the "PUSH transmission". Then, in step F411, the application manager unit 108 of the wireless communication apparatus 201 notifies the application unit 107 of a control message for instructing it to activate the reception application.

In step F416, the application unit 107 of the wireless communication apparatus 201 activates the reception application, according to a content of the received control message, and prepares for the PUSH transmission from the wireless communication apparatus 203.

In step F412, the application manager unit 108 of the wireless communication apparatus 201 transmits an execution processing message to the connection control unit 102. In step F413, the connection control unit 102 transmits the execution processing message to the wireless communication apparatus 203. In the wireless communication apparatus 201, since any operation of the data transmission and reception by the user is not performed, the content of the execution processing message is set to be "NULL".

In step F414, the connection control unit 102 of the wireless communication apparatus 203 that has received an execution processing message in step F413, notifies the application manager unit 108 of the execution processing message. The execution processing message confirmation unit 104 of the wireless communication apparatus 203 confirms the message, and determines that there is particularly no processing requested by the wireless communication apparatus 201.

Then, in step F415, the application manager unit 108 of the wireless communication apparatus 203 notifies the application unit 107 of a control message for instructing it to start data transmission by the transmission application that is running. In step F417, the application unit 107 of the wireless communication apparatus 203 starts the PUSH transmission to the wireless communication apparatus 201 using the transmission application currently running, according to the content of the received control message.

In step F418, the application unit 107 of the wireless communication apparatus 203, upon completion of the PUSH transmission, transmits the PUSH completion notification, then in step F420, terminates the transmission application. In step F419, the application unit 107 of the wireless communication apparatus 201, upon receiving the PUSH completion notification in step F418, terminates the reception application.

In steps F421 and F422, the application units 107 of the wireless communication apparatus 201 and the wireless communication apparatus 203, upon terminating the reception and transmission application respectively, notify the user interface units 106 of the termination notification message. Then, respective user interface units 107 that have received the termination notification message, display (notify) a message to indicate that the data communication has been completed. A configuration to notify the user by voice or the like may be also acceptable.

In the above descriptions, a case where a receiving operation of data by the user is not performed in the wireless communication apparatus 201 has been described, but also in a case where the receiving operation has been performed, the processing is not different significantly.

If an instruction for receiving data is performed by the user, the application unit 107 of the wireless communication apparatus 201 activates first the reception application, rather than step F416. Then, in step F411, the application manager unit 108, upon receiving the execution processing message in step F410, transmits a control message for instructing the application unit 107 to start reception of the data.

As described above referring to FIGS. 3 and 4, in the present exemplary embodiment, when data transmission operation by the user in the wireless communication apparatus is performed, the transmission and reception of an execution processing message is first performed between the wireless communication apparatus and the partner apparatus, without immediately starting the data transmission even if connection of the wireless link is completed. Then, if a content of the execution processing message received from the partner apparatus is confirmed, and it is recognized that the partner apparatus is also going to perform data transmission, then transmission order of the data is determined, and control of application is performed based on the determined result.

As a method for determining a transmission order of data, it is determined so that, for example, an apparatus that has received a connection response, namely, an apparatus that has transmitted the connection request, performs first data transmission, and an apparatus that has received the connection request, namely, an apparatus that has transmitted the connection response, performs subsequently data transmission.

If an execution processing message serving as data transmission notification is not sent from the partner apparatus, the apparatus determines that only the apparatus itself performs the data transmission, and starts the data transmission. Even if the user does not perform data receiving operation at the one apparatus, the reception application is activated upon receiving the execution processing message from the partner apparatus. As a result, if operation is performed only at data transmitting side, the data communication by the short-range wireless communications can be performed.

Hence, if the both apparatuses have a function of performing the above-described execution processing notification, data transmission that the user desires can be surely completed.

In a system for performing one-to-one data communication, if the wireless link with the partner apparatus is established in a state where data of the transmission target is designated, like infrared communication of a mobile telephone, the wireless link may be eventually disconnected at the time when the data transmission from the own-apparatus to the partner apparatus is completed.

On the other hand, according to the present exemplary embodiment, even if the wireless link is established between the apparatus and the partner apparatus while data of the transmission target is designated, as long as there is data transmission notification from the partner apparatus, even if the data transmission from the apparatus is completed, the apparatus prepares for the data transmission from the partner apparatus without disconnecting the wireless link. Therefore, even if the both apparatuses are brought close to each other in a state where data of the transmission target is designated in both apparatuses, the both apparatuses can avoid errors and can perform the data communication with each other.

Next, the data communication to be performed between an apparatus that performs the above-described execution processing notification, and an apparatus that does not perform the execution processing notification (hereinafter, a legacy apparatus) will be described below. In the description hereinbelow, the wireless communication apparatus 201 is a legacy apparatus, and is assumed not to have some functions (e.g., units 103, 104, and 105) in block configuration in FIG. 1.

Figure 5:
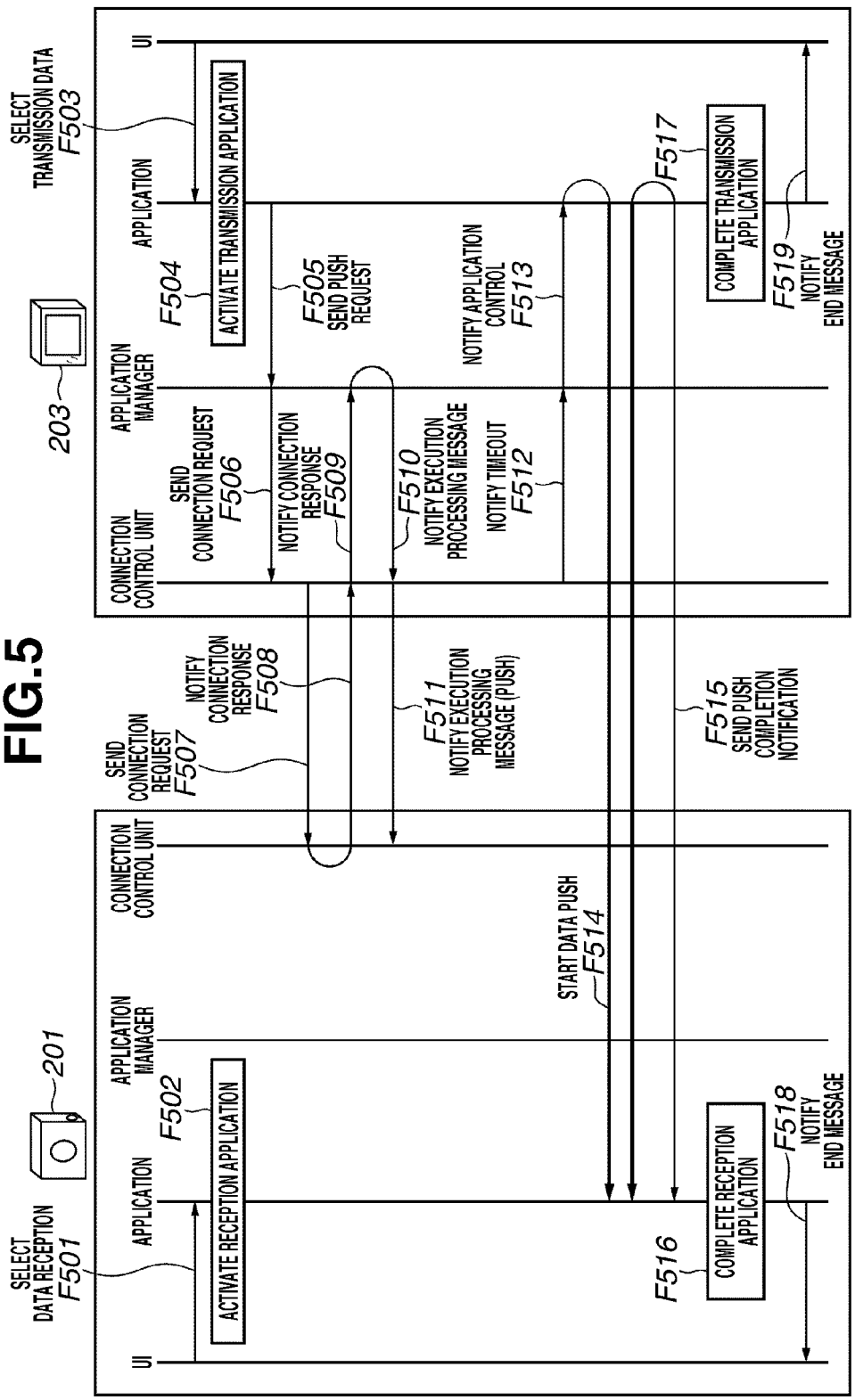
FIG. 5 is a sequence diagram 3.

FIG. 5 illustrates a sequence when the data transmitting operation is performed in the wireless communication apparatus 203, and data receiving operation is performed in the wireless communication apparatus 201.

In steps F501, and S1101, when reception of data is instructed by an operation of the user interface 106 by the user in the wireless communication apparatus 201, then in step F502, the application unit 107 activates the reception application.

In step F503, when selection (designation) of the transmission data and transmission instruction are performed in the wireless communication apparatus 203, then in step F504, the application unit 107 activates the transmission application. After the transmission application has been activated, the user brings two apparatuses close to each other so that a distance between the wireless communication apparatus 203 and the wireless communication apparatus 201 falls within a predetermined range.

The application unit 107 of the wireless communication apparatus 203 transmits a request for the PUSH transmission to the application manager unit 108. In step F505, the application manager unit 108 that has received the PUSH request sends the connection request to the connection control unit 102. In step F506, the application manager unit 108 that has received the PUSH request sends the connection request to the connection control unit 102.

In step F507, the connection control unit 201 of the wireless communication apparatus 203 transmits the connection request to the wireless communication apparatus 201. In step F508, the wireless communication apparatus 201, upon receiving the connection request, transmits the connection response to the wireless communication apparatus 203. The wireless communication apparatus 203, upon receiving the connection response, determines that the wireless communication apparatus 203 itself becomes the priority side, and causes the storage unit 108 to store thereof.

In step F509, the connection control unit 102 of the wireless communication apparatus 203, upon receiving the connection response, notifies the application manager unit 108 of the connection response. In step F510, the application manager unit 108 of the wireless communication apparatus 203, upon receiving the connection response, sends an execution processing message indicating the "PUSH transmission" to the connection control unit 102. In step F511, the connection control unit 102 transmits an execution processing notification to the wireless communication apparatus 201.

In this process, the wireless communication apparatus 201, since it is a legacy apparatus, cannot comprehend the execution processing message, and does not perform response for the execution processing message to the wireless communication apparatus 203. Also, since a receiving operation of data has been performed in the wireless communication apparatus 201, a transmission of the data from the wireless communication apparatus 201 is not also performed.

As the result, in step F512, the time measuring unit 110 of the wireless communication apparatus 203 detects timeout of an execution processing timer, and transmits timeout notification to the application manager unit 108. In step F513, the application manager unit 108 determines that data transmission from the partner apparatus is not performed, and notifies the application unit 107 of a control message for instructing it to start data transmission by the transmission application currently running.

In step F514, the application unit 107 of the wireless communication apparatus 203 starts the PUSH transmission to the wireless communication apparatus 201 using the transmission application currently running according to a content of the received control message.

In step F515, the application unit 107 of the wireless communication apparatus 203, when the PUSH transmission is completed, transmits the PUSH completion notification, and in step F517, terminates the transmission application. In step F516, the application unit 107 of the wireless communication apparatus 201, when receiving the PUSH completion notification in step F515, terminates the reception application.

In steps F518 and F519, the application units 107 of the wireless communication apparatus 201 and the wireless communication apparatus 203, when terminating the reception and transmission applications respectively, notify the user interface units 106 of the termination notification messages. Then, the user interface units 106 that have received the termination notification messages, displays (notify) a message to indicate that the data transmission has been completed. A configuration to notify the user by voice or the like may be also acceptable.

Figure 6:
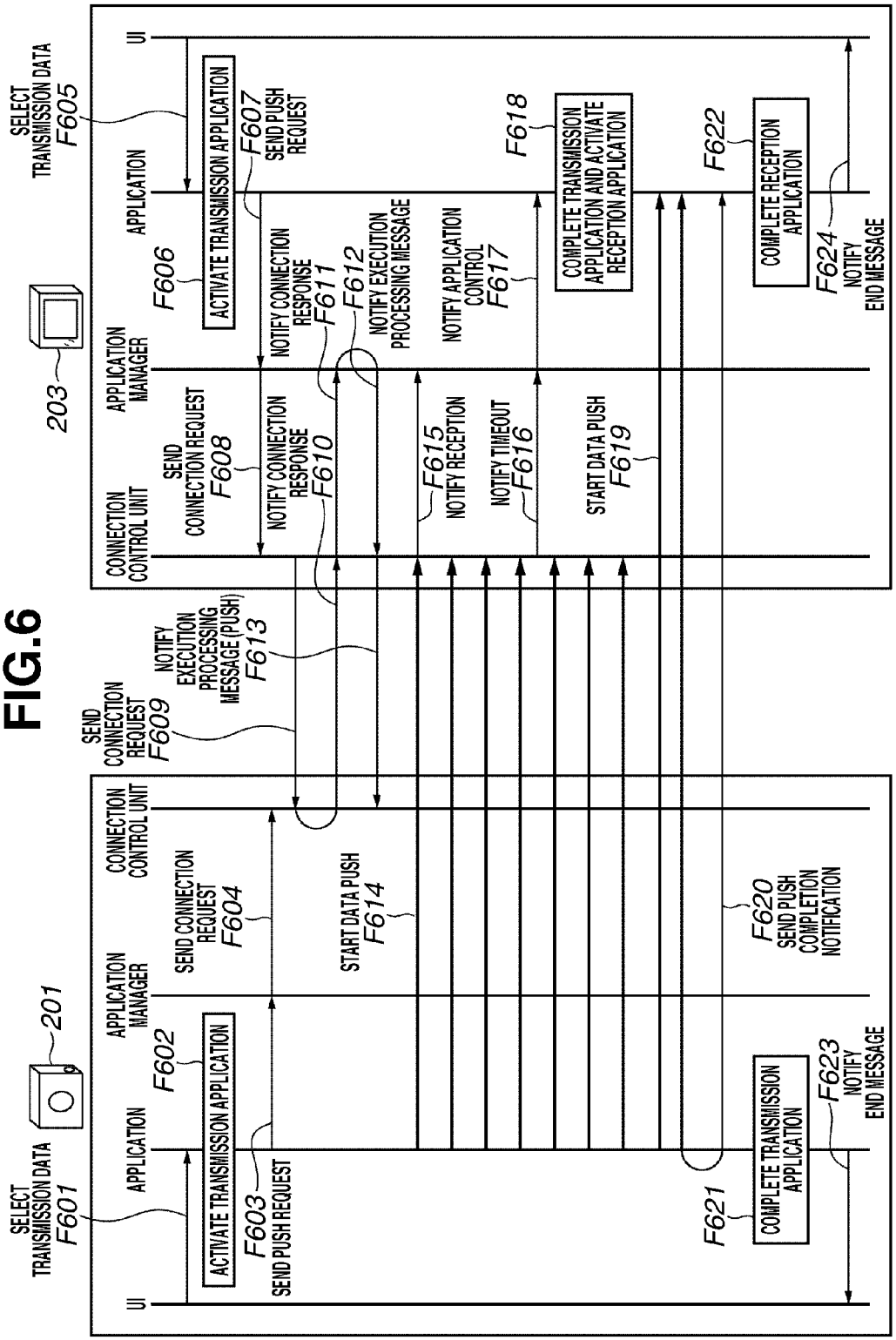
FIG. 6 is a sequence diagram 4.

FIG. 6 illustrates a sequence when data transmission operations have been performed, not only in the wireless communication apparatus 203, but also in the wireless communication apparatus 201 that is a legacy apparatus.

Since the processing, in step F601 through F613, until the execution processing message is transmitted from the wireless communication apparatus 203 to the wireless communication apparatus 201 is similar to the processing in steps F301 through F313 in the sequence of FIG. 3, descriptions thereof will be herein omitted.

The wireless communication apparatus 201, since it is a legacy apparatus, cannot comprehend the execution processing message in step F613, and does not perform response for the execution processing message to the wireless communication apparatus 203. In step F614, the wireless communication apparatus 201 determines that there is no data transmission from the wireless communication apparatus 203 serving as the priority side, and starts the data transmission by PUSH.

However, since the reception application is not activated in the wireless communication apparatus 203, connection control unit 102 of the wireless communication apparatus 203 does not transmit data from the wireless communication apparatus 201 to the application unit 107, so the PUSH transmission is not successful. Since the wireless communication apparatus 201 cannot receive confirmation response (ACK signal) from the wireless communication apparatus 203 in response to the transmitted data, it sends again the transmission data.

In step F615, since the connection control unit 102 of the wireless communication apparatus 203 recognizes that some data is received, it transmits reception notification to the application manager unit 108.

When an execution processing timer that has been running in the time measuring unit 109 of the wireless communication apparatus 203 reaches its timeout limit, then in step F616, a timeout notification is transmitted to the application manager unit 108. Since the application manager unit 108 has already received a reception notification from the connection control unit 102, it is determined that the partner apparatus is a legacy apparatus and the data transmission from the partner apparatus is being performed.

Then, in step F617, the application manager unit 108 notifies the application unit 107 of a control message for instructing it to terminate the transmission application to activate the reception application, for performing receiving processing of data transmitted from the partner apparatus. In step F618, the application unit 107 of the wireless communication apparatus 203 terminates the transmission application currently running, according to a content of the received control message, and activates the reception application.

In step F619, when the reception application of the wireless communication apparatus 203 is activated, the data transmitted from the wireless communication apparatus 201 can reach the application unit of the wireless communication apparatus 203, and the PUSH transmission is normally performed.

In the above description, in step F617, the application manager unit 108 of the wireless communication apparatus 203, after having waited for a timeout limit of the execution processing timer in step F616, performs activation instruction of the reception application.

However, it is not always necessary to wait for a reception of the execution processing message until a timeout is reached, but it may be acceptable to transmit an activation instruction of the reception application at a timing when the reception notification from the connection control unit 102 is received in step F615. In this case, it may be acceptable to stop the execution processing timer currently running, at the time when the reception notification is received. With this configuration, a start timing of data reception from the wireless communication apparatus 201 can be earlier than that when waiting until timeout, and a time required until completion of data reception is reduced.

In step F620, the wireless communication apparatus 201, which has finished the transmission of data, transmits the PUSH completion notification to the wireless communication apparatus 203, and then in step F621, terminates the transmission application. In step F622, the wireless communication apparatus 203, which has received the PUSH completion notification, terminates the reception application.

In steps F623 and F624, the application units 107 of the wireless communication apparatus 201 and the wireless communication apparatus 203, when terminating the transmission and reception applications, notify the user interface units 106 of termination notification messages. The user interface unit 106 of the wireless communication apparatus 201 that has received the termination notification message, displays (notifies) a message to indicate that the data transmission has been completed.

Alternatively, a configuration to notify the user by voice or the like may be acceptable. On the other hand, the user interface unit 106 of the wireless communication apparatus 203 that has received the termination notification message, displays a message indicating that data reception from the partner apparatus (wireless communication apparatus 201) is completed, but data transmission from the own-apparatus (wireless communication apparatus 203) is not completed. If the user desires to complete data transmission, the user interface unit 106 may display a message for prompting the user to perform transmission operation of data once again (bring the transmission source apparatus close to the transmission destination apparatus after having performed transmission instruction).

As described above referring to FIGS. 5 and 6, in the present exemplary embodiment, the application units 107 does not immediately start transmission of data when the execution processing message is not sent from the partner apparatus, but performs data transmission from the own-apparatus, after having checked whether the data transmission from the partner apparatus exists. The execution processing message may not be transmitted from the partner apparatus even if a predetermined time has elapsed, and furthermore other data may not be transmitted. In such a case, transmission processing of the data can be surely performed by starting data transmission from the own-apparatus.

If the execution processing message is not transmitted but other data is transmitted from the partner apparatus, at least reception of data from the partner apparatus can be surely performed by switching to a receiving processing of data. In other words, if the both apparatuses perform data transmission operation, both data transmission processing may become error. However, according to the present exemplary embodiment, at least one data transmission can be successfully completed.

Since a message for prompting the user to perform transmission operation of data once again is displayed in the other apparatus that cannot perform transmission of data too, the user can complete the data transmission by newly performing data transmission operation, thereby convenience of the user can be enhanced.

Figure 8:
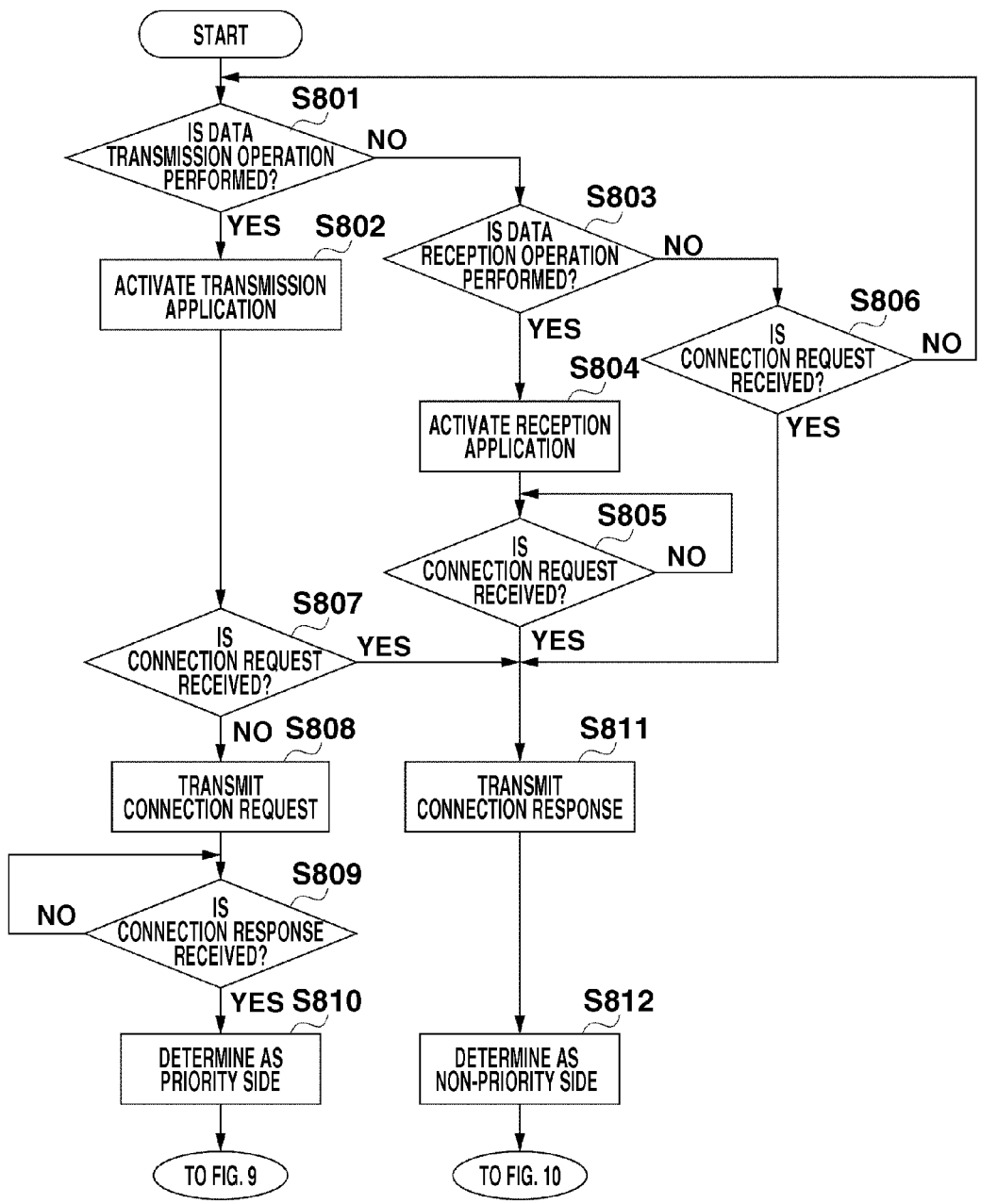
FIG. 8 is an operation flowchart until the wireless communication apparatus is determined to become which of the priority side and the non-priority side.

Next, a processing flow of the respective wireless communication apparatuses will be described. FIG. 8 illustrates a processing flow, after the processing is started, until it is determined that an apparatus becomes the priority side or the non-priority side.

First, in the wireless communication apparatus, the processing is branched depending on whether transmission operation of data by the user is performed in step S801, reception operation of data is performed in step S803, or connection request is received from the partner apparatus in step S806 while the user operation is not performed.

If selection (designation) of transmission data and transmission instruction are performed by the user (YES in step S801), then in step S802, the wireless communication apparatus activates the transmission application. After that, when the user brings the wireless communication apparatus and the partner apparatus close to each other, then in step S807, the wireless communication apparatus checks whether connection request is sent first from the partner apparatus. If the wireless communication apparatus does not receive the connection request (NO in step S807), then in step S808, the wireless communication apparatus transmits the connection request to the partner apparatus.

After having transmitted the connection request, then in step S809, the wireless communication apparatus waits for the connection response to be transmitted from the partner apparatus. If the wireless communication apparatus has received the connection response (YES in step S809), then in step S810, the wireless communication apparatus determines that the apparatus itself becomes the priority side, and the processing proceeds to the processing in FIG. 9. The wireless communication apparatus 203 in a sequence in FIGS. 3 through 6 performs the above-described processing.

In step S807, if the connection request from the partner apparatus is received first (YES in step S807), then in step S811, the wireless communication apparatus transmits the connection response to the partner apparatus. In this case, in step S812, the wireless communication apparatus determines that the own-apparatus becomes the non-priority side, and the processing proceeds to the processing in FIG. 10. The wireless communication apparatus 201 in the sequence in FIG. 3 performs the above-described processing.

If the reception instruction of data has been performed by the user (NO in step S801, and YES in step S803), then in step S804, the wireless communication apparatus activates the reception application, and in step S805, waits for reception of the connection request from the partner apparatus. When the connection request is received from the partner apparatus in step S805, then, in step S811, the wireless communication apparatus transmits the connection response to the partner apparatus. Then in step S812, the wireless communication apparatus determines that the own-apparatus becomes the non-priority side, and the processing proceeds to the processing in FIG. 10.

If the wireless communication apparatus has received the connection request from the partner apparatus while any of the transmission operation and the reception operation by the user is not performed (NO in step S801, NO in step S803, and YES in step S806), then in step S811, the wireless communication apparatus transmits the connection response to the partner apparatus. Then, in step S812, the wireless communication apparatus determines that the apparatus itself becomes the non-priority side, and the processing proceeds to the processing in FIG. 10. The wireless communication apparatus 201 in the sequence in FIG. 4 performs the above-described processing.

FIG. 9 illustrates a processing flow carried out by the wireless communication apparatus that has been determined as the priority side.

Firstly, in step S901, the wireless communication apparatus determined as the priority side, transmits the execution processing message to the partner apparatus. In this process, an execution processing message indicating the "PUSH transmission" serving as the data transmission notification is transmitted. Then in step S902, the wireless communication apparatus starts time measurement by the execution processing timer.

If the wireless communication apparatus has received the execution processing message from the partner apparatus before the timer reaches a timeout limit (NO in step S903, YES in step S904, and YES in step S905), then in step S907, the wireless communication apparatus confirms a content of the received execution processing message. If the content of the execution processing message from the partner apparatus is the "PUSH transmission" that is the same as that in the apparatus itself, then in step S908, since the wireless communication apparatus is the priority side for the data transmission, the wireless communication apparatus determines to receive the data from the partner apparatus after the wireless communication apparatus has first performed the data transmission.

If the content of the execution processing message from the partner apparatus is a "NULL" (NULL in step S907), then in step S909, since the partner apparatus does not make a request for the data transmission, the wireless communication apparatus determines to perform only the data transmission therefrom. Not only in the case where the "NULL" is included in the execution processing message from the partner apparatus, but also in the case where the content of the execution processing message is a request for reception of data, the wireless communication apparatus determines to perform the data transmission in the same way.

If the wireless communication apparatus has received data other than the execution processing message from the partner apparatus before the timer activated in step S902 reaches the timeout limit (NO in step S903, YES in step S904, and NO in step S905), then in step S906, the wireless communication apparatus stores thereof.

If the timer activated in step S902 reaches the timeout limit (YES in step S903), then in step S910, the wireless communication apparatus checks whether it has received data other than the execution processing message from the partner apparatus therebefore. If the wireless communication apparatus has received data other than the execution processing message (YES in step S910), then in step S911, the wireless communication apparatus determines to perform only data reception from the partner apparatus. If the wireless communication apparatus has not received data other than the execution processing message (NO in step S910), then in step S912, the wireless communication apparatus determines to perform only data transmission from the apparatus itself. When the wireless communication apparatus performs either of transmission, or reception of data, or determines order of the data transmission, in Steps S908, S909, S911, and S912, the processing proceeds to the processing in FIG. 7.

In the above descriptions, even in the case where the wireless communication apparatus has received data other than the execution processing message (NO in step S905), the wireless communication apparatus waits for the execution processing timer to reach the timeout limit (YES in step S903), the wireless communication apparatus does not necessarily need to wait until the timer reaches the timeout limit. That is, at the time when receiving data other than the execution processing message (NO in step S905), then in step S911, it may be acceptable to stop time measurement by the execution processing timer, and determine to perform only data reception from the partner apparatus. With this configuration, a time needed until the data communication is started can be further shortened.

FIG. 10 illustrates a processing flow performed by the wireless communication apparatus determined as the non-priority side.

In step S1001, the wireless communication apparatus determined as the non-priority side waits for the execution processing message to be transmitted from the partner apparatus. Upon receiving the execution processing message transmitted from the partner apparatus (YES in step S1001), then in step S1002, the wireless communication apparatus confirms the content. Then in step S1003, the wireless communication apparatus transmits the execution processing message to the partner apparatus.

In this process, if data transmission operation by the user is performed in the wireless communication apparatus too, the wireless communication apparatus transmits the execution processing message indicating the "PUSH transmission"

serving as the data transmission notification. If receiving operation of data by the user is performed, or no transmitting operation and receiving operation by the user is performed, the wireless communication apparatus transmits the execution processing message including the "NULL". The wireless communication apparatus may transmit the execution processing message indicating a request for reception data, in place of the "NULL".

If the wireless communication apparatus has transmitted the execution processing message indicating the "PUSH transmission" (PUSH in step S1003), then in step S1004, since the own-apparatus is the non-priority side, the wireless communication apparatus determines to transmit the data of the own-apparatus after having first received the data from the partner apparatus. If the wireless communication apparatus has transmitted an execution processing message containing the "NULL", or an execution processing message indicating a request for reception of data (NULL in step S1003), then in step S1005, the wireless communication apparatus determines to perform only data reception from the partner apparatus.

If an execution processing message is not transmitted from the partner apparatus (NO in step S1001), and other data is received (YES in step S1006), it means that the partner apparatus does not have an execution processing notification function. Therefore, in this case, in step S1005, the wireless communication apparatus determines not to perform data transmission therefrom, but to perform only reception of data transmitted from the partner apparatus.

Figure 7:
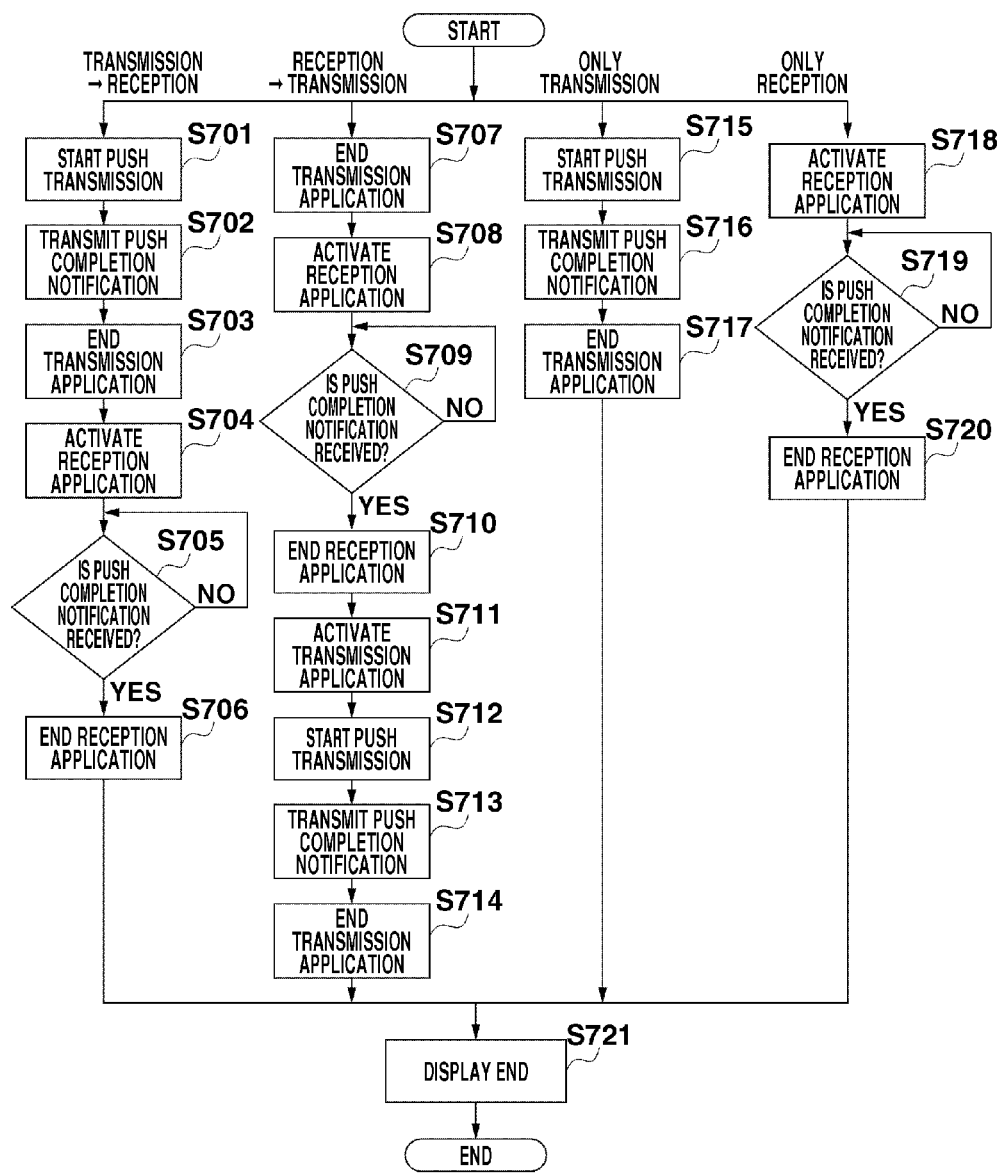
FIG. 7 is an operation flowchart when the wireless communication apparatus transmits or receives data.

Upon determining transmission order of data or whether to perform only data reception in steps S1004 and S1005, the processing proceeds to the processing in FIG. 7.

FIG. 7 illustrates a processing flow when performing transmission or reception of data based on roles of the transmission and reception, and transmission order determined by the processing in FIG. 9 or in FIG. 10.

If it is determined that the apparatus itself transmits data and subsequently receives data from the partner apparatus in step S908 in FIG. 9, the processing proceeds to step S701, and the wireless communication apparatus starts the PUSH transmission of data. When the PUSH transmission is completed, then in step S702, the wireless communication apparatus transmits a PUSH completion notification, and then in step S703, terminates the transmission application.

Then in step S704, the wireless communication apparatus activates the reception application, and starts reception of the data transmitted from the partner apparatus. In step S705, upon receiving the PUSH completion notification from the partner apparatus (YES in step S705), then in step S706, the wireless communication apparatus terminates the reception application.

In step S1004 in FIG. 10, if it is determined that the apparatus itself transmits data after having received the data from the partner apparatus, the processing proceeds to step S707, and the wireless communication apparatus terminates the transmission application currently running. Then in step S708, the wireless communication apparatus activates the reception application, and starts reception of the data transmitted from the partner apparatus.

Upon receiving the PUSH completion notification from the partner apparatus (YES in step S709), then in step S710, the wireless communication apparatus terminates the reception application, then in step S711, reactivates the transmission application. Then in step S712, the wireless communication apparatus starts the PUSH transmission of data, then in step S713, transmits the PUSH completion notification when the PUSH transmission is completed, and after that, in step S714, terminates the transmission application.

In steps S909 or S912 in FIG. 9, if it is determined that only the apparatus itself performs the data transmission, the processing proceeds to step S715, the wireless communication apparatus starts the PUSH transmission of data using the transmission application currently running. When the PUSH transmission is completed, then in step S716, the wireless communication apparatus transmits the PUSH completion notification, and then terminates the transmission application.

In steps S911 or S1005 in FIG. 10, if it is determined to perform only data reception from the partner apparatus, the processing proceeds to step S718. Then the wireless communication apparatus activates the reception application if it is not yet activated, and starts reception of data transmitted from the partner apparatus. If the PUSH completion notification is transmitted from the partner apparatus (YES in step S719), then in step S720, the wireless communication apparatus terminates the reception application.

Then in steps S706, S714, S717, S720, when the transmission or reception application is terminated, then in step S721, the wireless communication apparatus displays a message that the data communication has been completed, and terminates the processing.

Even though transmitting operation of data has been performed, if the wireless communication apparatus performs only reception of data since the partner apparatus does not have an execution processing notification function, then in step S721, the wireless communication apparatus displays a message representing that data reception from the partner apparatus has been completed, but data transmission from the apparatus itself has not been completed.

Also, if the user desires to complete the data transmission, a message for prompting the user to perform once again transmitting operation of the data (to bring the transmission source apparatus close to the transmission destination apparatus after performing transmission instruction of data) may be displayed.

As described above, according to the present exemplary embodiment, if data transmission operation by the user is performed, the wireless communication apparatus checks whether the partner apparatus also makes a request for transmission of data without immediately starting data transmission, even if a wireless link connection is completed and data transmission becomes possible.

In the above descriptions, as a use case of the short-range wireless communication system, the case where the data communication is carried out by bringing an apparatus close to a partner apparatus, after the user has performed selection of transmission data, and transmission instruction, has been described, but there may be a case where transmission instruction is not performed.

For example, three may be a use case where, when a wireless link is established in a state where data of the transmission target is selected, or a state where only data of the transmission target is displayed on a display, the data being currently selected or being currently displayed is transmitted to the partner apparatus. The present invention can be applied to such use cases. In this case, the data being currently selected, or being currently displayed when the wireless link is established will be the data designated as the transmission target.

Also, in the foregoing descriptions, transmitting and receiving an execution processing message after the wireless link connection has been completed by transmitting and receiving the connection request and connection response, but the execution processing message may be transmitted while containing it in the connection request and connection response.

If information indicating data transmission is contained in both of, for example, the connection request and the connection response, it is determined that a transmission source apparatus of the connection request serving as the priority side performs first the data transmission, and a transmission source apparatus of the connection response serving as the non-priority side performs subsequently the data transmission. Then, controls of the transmission and reception applications are performed depending on the determined result.

With such a configuration, a time needed until the data transmission is started is shortened, compared with the case of separately transmitting and receiving the execution processing message. As a result, a time needed until the data communication is completed can be also shortened.

Also, in the foregoing descriptions, it has been described that only the transmission application is activated, when performing selection of transmission data by the user and transmission instruction, but the reception application may be activated too.

In this case, when data transmission notification from the partner apparatus is received, the application is not terminated even if the data transmission from the apparatus itself is completed, the apparatus prepares for data reception from the partner apparatus using the reception application currently running. Then, the reception application at the time may be terminated when data transmission from the partner apparatus is completed. Thus, activation and termination of the transmission and reception applications can be easily controlled.

In the foregoing descriptions, there has been described the case where an apparatus, which has transmitted the connection request, transmits first an execution processing notification. However, an apparatus, which has transmitted the connection response, first may transmit the execution processing notification.

As a matter of course, the objectives of the present invention are also achieved by supplying a recording medium that has recorded a computer program of software for realizing the functions of the present exemplary embodiments to a system or an apparatus, and by causing a computer (a CPU or an MPU) of the system or the apparatus to read out and to execute a program code stored in the recording medium.

As described above, according to the present exemplary embodiment in a communication system for establishing one-to-one wireless link to perform data communication by bringing two apparatuses close to each other, even if the both apparatuses are in a state where data of transmission target is designated, the transmission and reception of the data can be adaptively controlled.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-137345 filed Jun. 8, 2009, which is hereby incorporated by reference herein in its entirety.

What is claimed is:

1. A communication apparatus capable of establishing a one-to-one wireless link with a partner apparatus by being brought close thereto within a predetermined range to perform data communication, the communication apparatus comprising:
    a notification unit, when the communication apparatus is brought within the predetermined range of the partner apparatus in a state where data of a transmission target is designated, configured to notify the partner apparatus of a transmission notification indicating that data transmission is to be performed before starting transmission of the data of the transmission target;
    a determination unit configured to determine a transmission order of the data, when the communication apparatus receives the transmission notification from the partner apparatus;
    a communication control unit configured to perform communication control by switching between transmission of the data to the partner apparatus, and reception of the data from the partner apparatus according to the transmission order determined by the determination unit; and
    a time measuring unit configured to measure a predetermined length of time during which the communication control unit waits for reception of the transmission notification,
    wherein if the transmission notification from the partner apparatus is not received and the predetermined length of time has elapsed, the communication control unit starts transmission of the data to the partner apparatus.

2. The communication apparatus according to claim 1, wherein when it is determined by the determination unit that the communication apparatus performs data transmission earlier than the partner apparatus, the communication control unit receives the data from the partner apparatus without disconnecting the wireless link even when transmission of the data to the partner apparatus is completed.

3. The communication apparatus according to claim 1, wherein if transmission of the data is started and the transmission notification is not transmitted from the partner apparatus, the communication control unit starts reception of the data transmitted from the partner apparatus without performing transmission of the data.

4. The communication apparatus according to claim 1, further comprising:
    an establishment unit configured to establish the wireless link by either one of the communication apparatus and the partner apparatus transmitting a connection request, and another apparatus replying with a connection response,
    wherein the determination unit determines the transmission order of the data according to whether the communication apparatus has transmitted the connection request or the connection response.

5. The communication apparatus according to claim 1, further comprising a second notification unit configured to notify a user of a transmission state of the data, wherein the second notification unit does not notify the user that the data transmission is complete until reception of the data from the partner apparatus is complete, even if transmission of the data is completed earlier than the partner apparatus.

6. The communication apparatus according to claim 1, wherein the notification unit notifies the partner apparatus of the transmission notification according to the establishment of the wireless link with the partner apparatus.

7. The communication apparatus according to claim 1, wherein the notification unit transmits a connection request or a connection response for the establishment of the wireless link added with the transmission notification thereto.

8. A communication apparatus capable of establishing a one-to-one wireless link with a partner apparatus by being brought close thereto within a predetermined range to perform data communication, the communication apparatus comprising:
    a notification unit, when the communication apparatus is brought within the predetermined range of the partner apparatus in a state where data of a transmission target is designated, configured to notify the partner apparatus of a transmission notification indicating that data transmission is to be performed before starting transmission of the data of the transmission target;
    a determination unit configured to determine a transmission order of the data, when the communication apparatus receives the transmission notification from the partner apparatus;
    a communication control unit configured to perform communication control by switching between transmission of the data to the partner apparatus, and reception of the data from the partner apparatus according to the transmission order determined by the determination unit; and
    an application control unit configured to control activation and termination of an application for data transmission or for data reception,
    wherein the application control unit activates the application for data transmission according to a data transmission instruction by a user, and controls the application for data transmission or application for data reception currently running according to the transmission order determined by the determination unit.

9. The communication apparatus according to claim 8, wherein when it is determined by the determination unit that the partner apparatus performs data transmission earlier than the communication apparatus, the application control unit terminates the application for data transmission currently running and activates the application for data reception, and reactivates the application for data transmission according to a termination of the data transmission from the partner apparatus.

10. The communication apparatus according to claim 8, wherein when it is determined by the determination unit that the communication apparatus performs data transmission earlier than the partner apparatus, the application control unit activates the application for data reception according to the termination of the data transmission by the application for data transmission currently running.

11. A control method for a communication apparatus capable of establishing a one-to-one wireless link with a partner apparatus by being brought close thereto within a predetermined range to perform data communication, the control method comprising:
    notifying the partner apparatus of a transmission notification indicating that data transmission is performed before transmission of data of a transmission target is started, when the communication apparatus is brought within the predetermined range of the partner apparatus in a state where the data of the transmission target is designated;
    determining a transmission order of the data, when the transmission notification is received from the partner apparatus;
    performing communication by switching between transmission of the data to the partner apparatus, and reception of the data from the partner apparatus according to the determined transmission order;
    measuring a predetermined length of time while waiting for reception of the transmission notification; and
    starting transmission of the data to the partner apparatus if the transmission notification from the partner apparatus is not received and the predetermined length of time has elapsed.

12. A non-transitory computer-readable storage medium storing computer-executable instructions for causing a computer to implement a control method for a communication apparatus capable of establishing a one-to-one wireless link with a partner apparatus by being brought close thereto within a predetermined range to perform data communication, the control method comprising:
    notifying the partner apparatus of a transmission notification indicating that data transmission is performed before transmission of data of a transmission target is started, when the communication apparatus is brought within the predetermined range of the partner apparatus in a state where the data of the transmission target is designated;
    determining a transmission order of the data, when the transmission notification is received from the partner apparatus;
    performing communication by switching between transmission of the data to the partner apparatus, and reception of the data from the partner apparatus according to the determined transmission order;
    measuring a predetermined length of time while waiting for reception of the transmission notification; and
    starting transmission of the data to the partner apparatus if the transmission notification from the partner apparatus is not received and the predetermined length of time has elapsed.

13. A control method for a communication apparatus capable of establishing a one-to-one wireless link with a partner apparatus by being brought close thereto within a predetermined range to perform data communication, the control method comprising:
    notifying the partner apparatus of a transmission notification indicating that data transmission is to be performed before starting transmission of the data of a transmission target when the communication apparatus is brought within the predetermined range of the partner apparatus in a state where data of the transmission target is designated;
    determining a transmission order of the data, when the communication apparatus receives the transmission notification from the partner apparatus;
    performing communication control by switching between transmission of the data to the partner apparatus and reception of the data from the partner apparatus according to the transmission order determined; and
    controlling activation and termination of an application for data transmission or for data reception,
    wherein the controlling step includes activating the application for data transmission according to a data transmission instruction by a user and controlling the application for data transmission or application for data reception currently running according to the transmission order determined.

14. A non-transitory computer-readable storage medium storing computer-executable instructions for causing a computer to implement a control method for a communication apparatus capable of establishing a one-to-one wireless link with a partner apparatus by being brought close thereto within a predetermined range to perform data communication, the control method comprising:

notifying the partner apparatus of a transmission notification indicating that data transmission is to be performed before starting transmission of the data of a transmission target when the communication apparatus is brought within the predetermined range of the partner apparatus in a state where data of the transmission target is designated;

determining a transmission order of the data, when the communication apparatus receives the transmission notification from the partner apparatus;

performing communication control by switching between transmission of the data to the partner apparatus and reception of the data from the partner apparatus according to the transmission order determined; and controlling activation and termination of an application for data transmission or for data reception, wherein the controlling step includes activating the application for data transmission according to a data transmission instruction by a user and controlling the application for data transmission or application for data reception currently running according to the transmission order determined.

* * * * *